Figure 1:
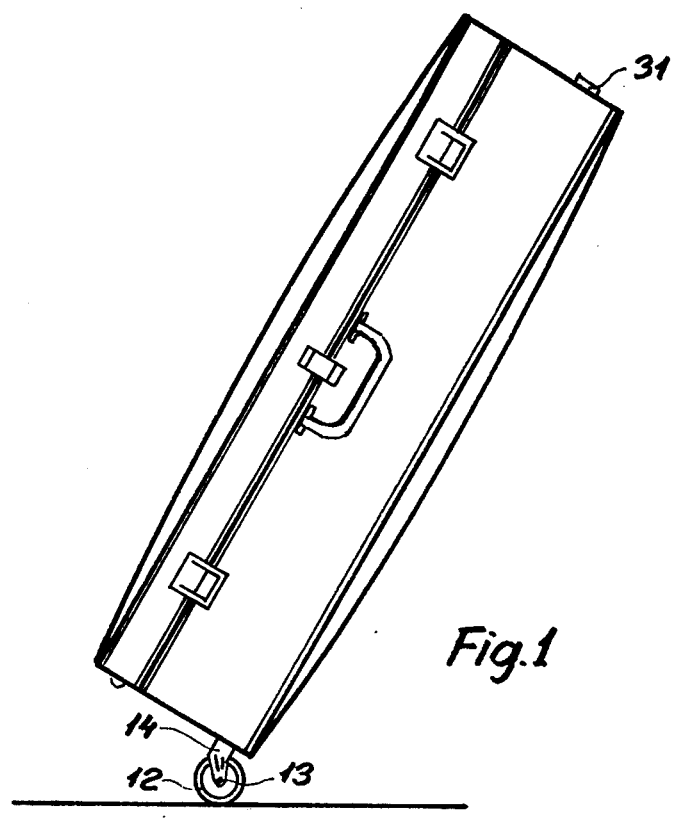

United States Patent [19]

Staal

[11] 4,026,569
[45] May 31, 1977

[54] WHEEL ASSEMBLY FOR A CONTAINER OR SUITCASE

[76] Inventor: Anne-Kathrine Staal, Kollemosevej 29 B, DK-2840 Holte, Denmark

[22] Filed: Nov. 19, 1975

[21] Appl. No.: 633,299

[30] Foreign Application Priority Data

Nov. 25, 1974 United Kingdom ............ 50889/74

[52] U.S. Cl. .................................... 280/43; 16/34; 190/18 A; 280/37
[51] Int. Cl.² ......................................... B62B 1/04
[58] Field of Search ............... 280/43, 43.1, 43.11, 280/43.14, 43.17, 43.19, 43.22, 37, 38, 39, 40, 641, 642, 643, 644, 645, 646; 190/18 A; 16/19, 32, 33, 34

[56] References Cited
UNITED STATES PATENTS

| | | | |
|---|---|---|---|
| 2,529,475 | 11/1950 | Anneren | 280/43.1 X |
| 2,558,909 | 7/1951 | Partiot | 280/37 |
| 2,779,049 | 1/1957 | Hoddevik | 16/34 |
| 3,057,636 | 10/1962 | D'Ettorre | 280/37 |
| 3,841,663 | 10/1974 | Proffit | 280/43.22 X |

Primary Examiner—Joseph F. Peters, Jr.
Assistant Examiner—R. Schrecengost

[57] ABSTRACT

Wheel assembly for a container or suitcase comprising a wheel casing adapted to be secured in the container or suitcase and a wheel mounted in a rotatable wheel fork which is movably disposed in the wheel casing so that the wheel can be moved between a parking position in which only a small portion of the wheel projects beyond the wheel casing and a wheeling position outwardly of the casing, the wheel fork being rotatably mounted in a bearing block which is disposed in the wheel casing to be displaceable between an inner and an outer position in which latter position it can be pivoted in the plane of the wheel casing.

2 Claims, 4 Drawing Figures

U.S. Patent  May 31, 1977  Sheet 2 of 2  4,026,569

WHEEL ASSEMBLY FOR A CONTAINER OR SUITCASE

This invention relates to a wheel assembly for a container or suitcase and comprises a wheel casing adapted to be secured in the container or suitcase and a wheel mounted in a rotatable wheel fork which is movably disposed in the wheel casing so that the wheel can be moved between a parking position in which only a small portion of the wheel projects beyond the wheel casing and a wheeling position outwardly of the casing.

In some known wheel assemblies of this type the movement of the wheel fork consists in a displacement along the axis of rotation of the fork. Such a construction requires a relatively long guide tube to ensure effective control of the fulcrum pin of the wheel fork. Besides, the wheel must be perpendicular to the wheel casing in the wheeling position to be fixed in that position, so that in the wheeling position the wheels can only be oriented in one way relatively to the container or suitcase dependent on the mounting of the wheel casing. Generally the assembly is mounted so that a suitcase standing edgeways can be wheeled with one broadside facing in the wheeling direction like a sack truck.

In other known wheel assemblies of the said type the wheel fork is pivotally mounted in the wheel casing and coupled to a displaceable handle by means of which the wheels can be manipulated. Such constructions, however, are both complex and space-consuming, and here, too, the wheels can be oriented in only one way in the wheeling position.

It is the object of the present invention to provide a wheel assembly of the said type which is compact, simple and stable, both in the parking position and in the wheeling position.

This object has been accomplished by an assembly in which the wheel fork is rotatably mounted in a bearing block which is disposed in the wheel casing to be displaceable between an inner and an outer position and so that in the latter position it can moreover be pivoted in the plane of the wheel casing. The bearing block need only be of quite modest dimensions and perform quite short movements to impart the desired movements to the wheel and to be itself controlled effectively within the wheel casing.

A simple way of controlling the bearing block to perform the said translatory and pivotal movements has been attained in that a side face of the bearing block, at any rate when the block is in a region in or near its inner position, is in sliding engagement with an end wall of the wheel casing or with a guide face parallel thereto and in that the bearing block is provided with a slot which extends parallel to the said side face and in which a transverse pin is engaged, the said members being so adjusted to each other that the said side face of the bearing block in its outer position moves free of the said end wall or guide face.

By providing at the opening of the wheel casing means defining a square recess for receiving a likewise square cross member of the wheel fork it has been ensured that the wheel fork can be fixed safely in two different positions perpendicular to one another, so that the container or suitcase can be optionally wheeled in a broadside direction or in an edgewise direction.

By providing a tension spring suspended between the bottom of the wheel casing and a point on the bearing block spaced from the axis of oscillation it will be possible to retain the wheel fork in any of the selected positions.

In a wheel assembly of this type where the legs of the wheel fork are inclined with respect to its axis of rotation the wheel casing may be provided with stop cams for limiting the inward pivotal movement of the wheel fork in any of the two positions dependent on the angular position of the wheel fork with respect to the bearing block, so as to obtain a well defined parking position in which a minor portion of the wheel preferably projects outside the wheel casing and to provide a possibility of placing the wheel in a second well defined wheeling position in which for instance one half of the wheel projects outside the wheel casing. This latter position is established by turning the wheel fork 180° in the bearing block before the wheel is swung into the wheel casing.

The invention will be explained below with reference to the drawing, in which

Figure 2:
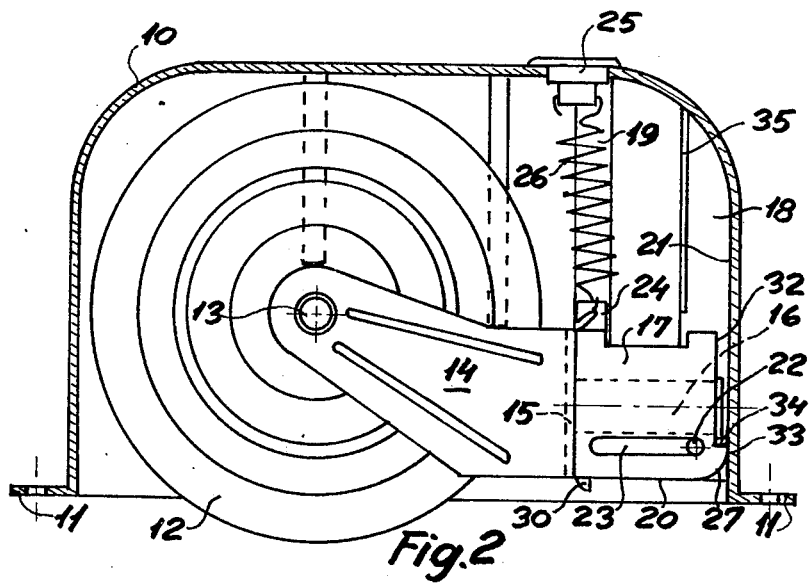
Figure 3:
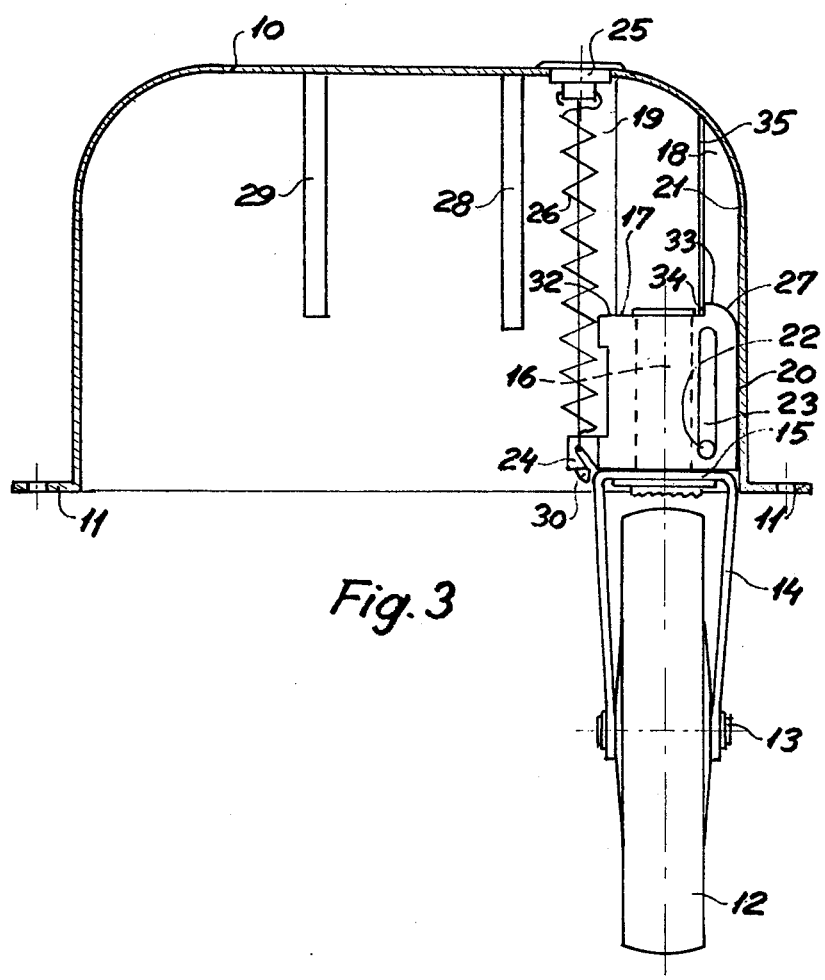
Figure 4:
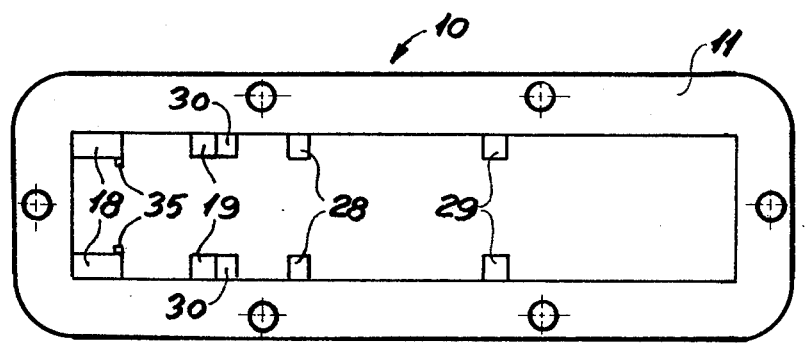

FIG. 1 shows a suitcase supported on wheel assembly according to the invention in the wheeling position, FIG. 2 presents on a larger scale an embodiment of the wheel assembly according to the invention with the wheel in parking position, viewed in side elevation and partly in section, FIG. 3 shows the same embodiment with the wheel in wheeling position, and FIG. 4 shows the wheel casing viewed from below.

In FIGS. 2–4 10 is a downwardly open wheel casing with a peripheral attachment flange 11 by means of which it can be attached in conventional manner in a suitcase wall, preferably an end wall as indicated in FIG. 1. The wheel 12 is rotatably mounted on a shaft 13 in a wheel fork 14 with a square cross member 15. To the said cross member is secured a swivel pin 16 which is mounted rotatably but nondisplaceably in a through-going bore in a bearing block 17 which is located between and in sliding contact with two pairs of guiding ribs 18 and 19 in respective side walls of the wheel casing. In the position indicated in FIG. 3 a side face 20 of the bearing block 17 which is parallel to the axis of the swivel pin 16 is in sliding contact with one end wall 21 of the wheel casing 10. A transversely disposed guide pin 22 which is secured to and extends between the side walls of the wheel casing is passed through a slot 23 in the bearing block 17 extending parallel to the side face 20 and having end faces of semicircular cross-section of approximately the same diameter as the guide pin. The slot 23 and the guide pin 22 are located so that the pin retains the bearing block in contact with the wall 21. Between a projection 24 on the bearing block 17 and a plug 25 inserted in a hole in the bottom of the wheel casing is suspended a tension spring 26 which tends to pull the bearing block upwards into the wheel casing and to retain it in the position indicated in FIG. 3, in which the guide pin 22 abuts on the lower end wall of the slot 23.

Opposite the other end of the slot 23 the bearing block 17 has a cylindrical corner face 27 of quarter-circular cross-section which is concentric with the semicircular cross-section of the end wall of the slot. The adjoining end face 32 of the bearing block 17 is recessed with respect to the face 33 perpendicular to the side face 20 and touching the quarter-cylinder 27, and the two faces 32 and 33 are interconnected by a shoulder 34 which is slightly higher than the length of the swivel pin 16 projecting beyond the end face 32. On the inner edge portion of each guide rib 18 is provided an inwardly facing locking rib 35 the outer end portion of which in the position of the bearing block 17 shown in FIG. 3 abuts on the shoulder 34.

When the bearing block 17 by a pull in the wheel 12 is drawn out against the action of the spring 26 until the upper end wall of the slot 23 impinges on the guide pin 22, the bearing block can be pivoted clockwise about the guide pin, FIG. 3, and when the wheel fork 14 has been turned 90° around the swivel pin 16 from the position shown in FIG. 3 the wheel 12 can be pivoted into the wheel casing 10. The pivotal movement is effected with cooperation from the spring 26 and is limited by the edge portions of the wheel fork 14 impinging on the end of a rib 28 formed on the inner face of each side wall of the wheel casing 10. With the wheel fork in the angular position shown in FIG. 2 the boundary position is the parking position of the wheel in which a small portion of the wheel projects beyond the wheel casing. The wheel is further fixed in this position by a second rib 29 on each side wall of the wheel casing abutting on the wheel fork 14 opposite the wheel shaft 13. If the wheel fork 14 had been turned 180° with respect to the position shown in FIG. 2 it would have been the opposed edge portions of the fork that abutted on the ribs 28 and in that case the wheel would be halted in a position in which about half the wheel projected beyond the wheel casing. This position is particularly expedient when wheeling the suitcase through narrow passages, for example train corridors. The fact that the wheel in the parking position projects slightly beyond the wheel casing contributes to prevent foreign objects penetrating into the casing, for instance when luggage is stowed. Besides, it is easy to grip the wheel when it is to be pulled out of the casing.

The guide ribs 18 and 19 terminate downwardly slightly above the plane defined by the front face of the flange 11, as shown in FIGS. 2 and 3. The guide ribs 19 are provided on the end surface with a projection 30 at the edge nearest the centre of the wheel casing. These projections define together with the side walls and end wall of the wheel casing a square recess for receiving the square cross member 15 of the wheel fork 14 in any of two positions perpendicular to each other and so that the wheel fork is retained safely in the selected position with the cooperation of the tension spring 26. In one of the said positions the suitcase can be wheeled in a broadside direction like a sack truck and in the other position the suitcase can be wheeled edgewise. In both positions the bearing block 17 is fixed effectively by the guide ribs 18 and 19 and the end wall 21 of the wheel casing, by the pin-slot connecton 22,23 and by the engagement between the shoulder 34 and the locking ribs 35.

To facilitate the handling of the suitcase during wheeling it may expediently be provided with a handle 31 on the end wall opposite that on which the wheel assemblies are located.

What I claim is:

1. A wheel assembly for a container or suitcase comprising in combination:
    a wheel casing having an open end and being adapted to be secured in the container or suitcase,
    a wheel fork carrying a rotatably mounted wheel and having an end portion defining a square,
    a wheel fork supporting block in which said wheel for is rotatably mounted,
    means including a pin-and-slot connection for mounting said supporting block in said wheel casing in such a manner that the supporting block is displaceable between an inner and an outer position,
    blocking means engageable with said supporting block in the inner position thereof to prevent pivotal movement of said block,
    means adjacent to and within the open end of said wheel casing, defining a square recess for receiving said end portion of said wheel fork, and
    a tension spring tensioned between points of said wheel casing and said supporting block respectively, which points are so located that in all positions of the supporting block said tension spring tends to draw said wheel into the wheel casing.

2. A wheel assembly according to claim 1 wherein said wheel fork has legs which are inclined with respect to its axis of rotation, and wherein two sets of stop means are provided in the wheel casing for limiting the inward pivotal movement of the wheel fork in a respective one of two different positions dependent on the angular position of the wheel fork with respect to the supporting block.

* * * * *